Dec. 13, 1960    MASATARO KAWARADA    2,963,912
GYROSCOPES
Filed April 20, 1959

INVENTOR:
MASATARO KAWARADA
BY
Wenderoth, Lind + Ponack
Attys.

United States Patent Office 2,963,912
Patented Dec. 13, 1960

2,963,912

GYROSCOPES

Masataro Kawarada, Tokyo, Japan, assignor to Ataka & Co., Ltd., Higashi-ku, Osaka, Japan, a corporation of Japan Filed Apr. 20, 1959, Ser. No. 807,400

Claims priority, application Japan Aug. 14, 1958

3 Claims. (Cl. 74—5.7)

The present invention relates to gyroscopes and particularly to electrically operated gyroscopes.

In accordance with the present invention, a gyroscope has a rotor made of permanent magnet material and mounted in a stator. The rotor and the stator constitute an electric motor having transistor circuits as a power source mounted within the stator, which is mounted on the second or the inner gimbal of the gyroscope, the output of said circuits being supplied to electro-magnetic coils secured to the inside of said stator.

In the past, electrical gyroscopes have comprised an induction motor which receives power supply exteriorly of the gyroscope, for example, through slip rings or flexible wires. Therefore, the rotative part of the motor has been subjected to excessive frictional resistance and thus the rotor required to be made considerably rugged in construction, which in turn adding to the entire volume of the gyroscope.

It is a principal object of this invention to provide a gyroscope which is compact in size, simple in construction and does not necessitate any exterior supply of electric power.

Another object of the present invention is to provide a gyroscope the gyroscopic mass of which forms a cylindrical body accommodating an electric motor and a source of power supply therefor comprising transistor circuits.

A further object of the present invention is to provide an electrical gyroscope including a cylindrical type electric motor formed of permanent magnet material and a stator surrounding the rotor and carrying at least one pair of electro-magnetic coils provided with a power source for producing magnetic flux in order to rotate the rotor.

A still further object of the present invention is the provision of a gyroscope of the kind described provided with at least one pair of coils, one of which is a current generating coil the other being an armature coil for the rotor, said generating coil generating a current by means of the flux of said rotor, and said armature coil being fed with a collector current obtained by amplifying the current from the generating coil through the transistors.

According to the present invention, the rotor comprising the gyroscopic mass is provided with a hollow cylindrical stator which accommodates a source of electrical power, eliminating need for supplying electrical power to the rotor through slip rings or flexible wires as in the prior art so that the problem of frictional resistance to free rotation may effectively be solved. Also, in accordance with the present invention, the electric motor is provided within the stator with at least one generating coil, at least one motor coil and a rotor radially magnetized in the form of a cylindrical member of a permanent magnetic material, the output of the generating coil caused by the rotation of the rotor being amplified by a transistor arranged within the stator and supplied to the armature coil, which produces a magnetic flux to cause the rotation of the rotor.

These coils are made in pairs, two or more, each pair comprising a generating coil and a motor coil, and are arranged at equally spaced intervals around the rotor. The coils of each pair are connected with a transistor circuit, the generator coil being connected between the emitter electrode and the base electrode to the transistor while the motor coil is connected between the collector electrode and said emitter electrode to the same. In other manner of the connection of said coils, the generating coil is connected to the emitter side of the transistor while the motor coil is connected to the collector side. As the rotor, which is radially polarized, rotates, one magnetic pole thereof comes opposite to the generating coil to generate therethrough a current which acts to induce the discharge of a direct current supply source, such as a dry battery, connected in a series with the motor coil, whereby the motor coil is supplied with an electric power at an amplified voltage. As is apparent, at least one such pair of coils must be provided on the stator of the motor, and, for the purpose of obtaining smooth rotation of the rotor while increasing its rotational speed, two or more such pairs of coils may be provided.

These and other objects, features and advantages of the present invention will become apparent from the following detailed description when read with reference to the accompanying drawings illustrating, by way of example, some embodiments of the invention, and in which drawings.

Figure 1:
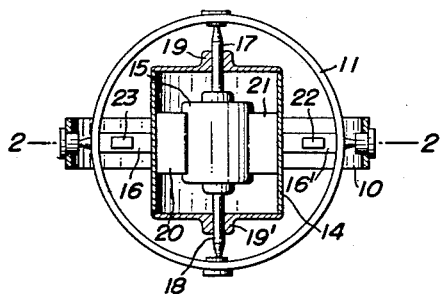
Figure 1 is a cross sectional view of the gyroscope according to the present invention.
Figure 2:
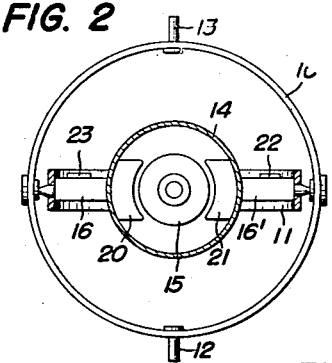
Figure 2 is a cross sectional view taken along the line 2—2 of Figure 1.

Referring now to the drawings, and specifically to Figures 1 and 2, there is shown a gyroscope having a gimbal structure which comprises a central gimbal ring 10 and an inner gimbal ring 11 both formed in the shape of an annular ring pivotally engaged to each other for free rotation at diametrically opposite points. The center gimbal ring 10 is pivotally mounted on a stationary support, which may be regarded as stationary relative to the gyroscope, by means of opposite pivot pins 12 and 13 provided on the gimbal ring 10 along the periphery of the gimbal ring 10 at points spaced ninety degrees apart from said pivotal connections between the two gimbal rings 10 and 11. A hollow cylindrical body 14 is fixed, coaxially with the center gimbal ring 10, to the inner gimbal 11 by bars 16 and 16' extending between opposite positions of the outer surface of said body 14 and inner wall of the inner gimbal ring 11.

As seen in Figures 1 and 2, the spinning top of the gyroscope comprises a cylindrically shaped rotor 15 mounted in said cylindrical body 14 and made of permanent magnet material by casting or sintering, said rotor having pivotally pivot pins 17 and 18 extending outwardly through and rotatably mounted in bearing portions 19 and 19' of the body 14 from the respective end faces of the cylindrical rotor 15. These pivot pins 17 and 18 have a common axis coincident with the longitudinal axis of the rotor 15, and are received in respective bearing members provided on the inner wall of the inner gimbal ring 11.

Arranged on the inner wall of the hollow cylindrical body 14 are two opposite electro-magnetic coils 20 and 21. Said coil 20 is a generating coil and said coil 21 is a motor coil. A D.C. current source such as a small dry-battery 22 is arranged on the bar 16′ and a transistor means 23 is secured on the bar 16. These coils 20 and 21, battery 22 and transistor means 23 are electrically connected by respective leads within the body 14 in respective prescribed manners. As mentioned above, the cylindrical body which is provided with the generating coil and the motor coil is constructed as one common stator of the generator and the motor. It is to be noted that, since all of these elements are component parts of the spinning top of the gyroscope, they are held in place on the stator 14 maintaining the entire top in a state of full dynamic balance.

Figure 3:
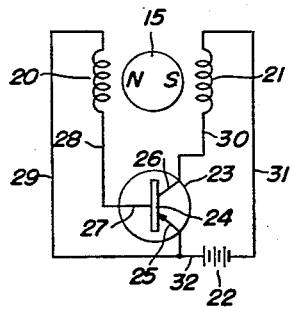
Figure 3 is a schematic showing of an electric circuit of the gyroscope in accordance with the present invention incorporating one current generating coil and one motor coil.

The electric circuit including the transistor means in the gyroscope as shown in Figures 1 and 2 is diagrammatically illustrated in Figure 3. As seen in Figure 3, the transistor means 23 includes a transistor element 24 which has an emitter electrode 25, a collector electrode 26 and a base electrode 27 as in the conventional manner.

As shown, the generating coil 20, which corresponds to the field coil in an electric generator, is connected through lead wires 28 and 29 with the emitter eletrode 25 and the base electrode 27, while on the other hand the motor coil 21 is connected by leads 30 and 31 in series with the collector electrode 26, the emitter electrode 25 and the dry battery 22.

Figure 6:
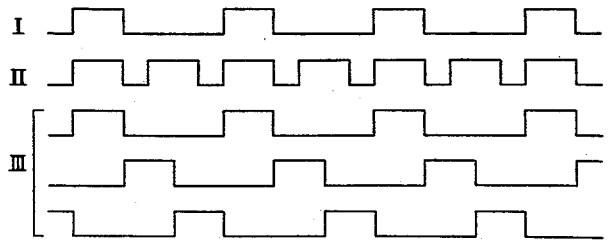
Figure 6 is a graphical representation of the current wave forms obtained in the respective circuits shown in Figure 5, illustrating such wave forms in relation to the angular position of the rotor.

It will be seen that the rotor 15 does not start to rotate by itself but is started by some external shock or the rotation of the stator. Once the rotor is started to rotate, each instant when magnetic poles of the rotor move toward and away from the generating coil 20 on the stator, an electromotive force is generated in the coil 20 and appears in the motor coil 21 as a power amplified through the transistor element 24 in accordance with the direction of current to act on the magnetic poles of the rotor thereby to rotate the latter. In this case, it will be apparent that a current flows through the collector electrode only when either the N-pole or the S-pole moves past the coil, depending upon whether the transistor element 24 is of the P-N-P type or the N-P-N type, as in the case of ordinary transistor devices. It will also be apparent that the direction of current generated depends upon the direction in which the coil 20 is wound. In any way, the voltage generation occurs twice in the coil 20 for each complete rotation of the rotor and the motor coil 21 is fed with a current once for every two occurrences of voltage generation. The wave form of the voltage induced is illustrated in Figure 6 by the line I. As will be seen, when a current flows through the motor coil 21, it is natural that the latter forms a magnetic field thereby causing the radially polarized rotor formed of permanent magnet material to be rotated.

Figure 4:
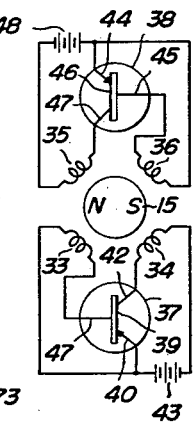
Figure 4 is a schematic showing of another electric circuit in accordance with the present invention incorporating two pairs of a generating and a motor field coil.

Figure 4 illustrates schematically another embodiment of the invention having two pairs of electro-magnetic coils arranged within the confines of the stator. Arranged on the inner wall of the cylindrical body 14 are a pair of electromagnetic coils 33 and 34 and a second pair of electro-magnetic coils 35 and 36, all of these coils being equally spaced apart from each other. The coils 33 and 36 are each a current generating coil while the coils 34 and 35 are each a motor coil. The two pairs of coils are provided with respective transistor devices 37 and 38. It will be understood that the circuit relating to each of the two pairs is identical with that shown in Figure 3. That is, the coil 33 is connected between the emitter electrode 40 and the base electrode 41 of a transistor element 39 of the transistor device 37 while the coil 34 is connected in series with a battery 43 between the collector electrode 42 and the emitter electrode 40 of said transistor element 39. The coil 36 is connected between the emitter electrode 44 and the base electrode 45 of a transistor element of the transistor device 38, whereas the coil 35 is connected in series with a battery 48 between the collector electrode 47 and the emitter electrode 44 of the transistor device 38.

In the spinning top of the gyroscope shown in Figure 4, as will be readily recognized, an electric voltage is induced in the two generating coils 33 and 36 each time the magnetic poles N and S of the rotor 15 move past the generating coils as the rotor rotates, causing an amplified current to flow through the collector electrode of each of the transistor electrodes 39 and 46 only when the direction of the voltage induced corresponds to the type of the transistor elements 39 and 46, which is just the same as in ordinary transistor devices. Thus, it will be seen that an electric current is caused to flow through the motor coils 34 and 35 twice for each complete revolution of the rotor at opposite points spaced 180 degrees apart from each other. The current then generates a magnetic flux thereby to cause the rotor to continue its rotation. The wave form of the voltage induced with this arrangement is shown in Figure 6 by the line II.

Figure 5:
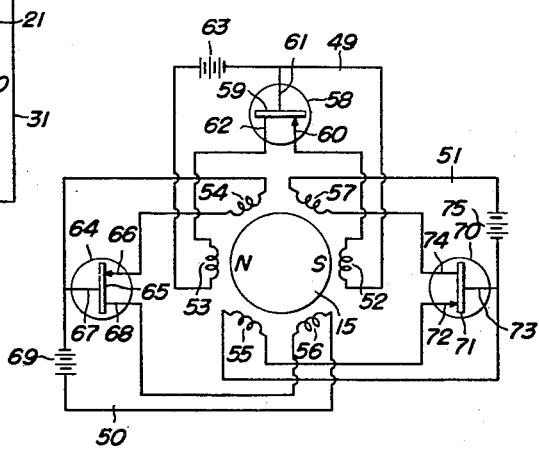
Figure 5 is a diagram of a further electric circuit according to the present invention incorporating three generating coils and three motor armature coils.

With reference to Figure 5, there is illustrated another embodiment of the spinning top of the gyroscope according to the present invention which is provided with three transistor circuits 49, 50 and 51, each of which circuits includes one current generating coil and one motor coil as with the case of each of the above described embodiments. As will be observed from the drawing, these circuits are grounded base system and the transistor circuit 49 includes a current generating coil or generator field coil 52 and a motor coil 53 while the transistor circuit 50 includes a generating coil 54 and a motor coil 56. The transistor circuit 51 includes a generating coil 55 and a motor coil 57.

Said generating coil 52 in the transistor circuit 49 is connected between the emitter electrode 60 and the base electrode 61 of a transistor element 59 in a transistor device 58 associated with the circuit 49. The motor coil 53 in the same circuit 49 is connected in series with a direct current source such as a battery 63 between the collector electrode 62 and the base electrode 61 of the transistor element 59. The generating coil 54 in the transistor circuit 50 is connected between the emitter electrode 66 and the base electrode 67 of a transistor element 65 in a transistor device 64, while the motor coil 56 is connected in series with a direct current source such as a battery 69 between the base electrode 67 and the collector electrode 68 of the transistor element 65. The generating coil 55 of the transistor circuit 51 is connected between the emitter electrode 72 and the base electrode of a transistor element 71 in the transistor device 70, while the motor coil 57 is connected in series with a direct current source such as a battery 75 between the base electrode 73 and the collector electrode 74 of the transistor element 71.

With the construction of the spinning top shown in Figure 5, the generating coils and the motor coils are arranged alternately in equally spaced apart relationship with each other around the rotor 15.

In the embodiment shown in Figure 5, a voltage is induced in the generating coils each time when the magnetic poles of the rotor move past the generating coils as the rotor rotates, as with the case of the embodiments described hereinbefore. Also, it will be readily recognized that a current is passed through the motor coils when the voltage is induced in the generating coils in accordance with the same principle as in the preceding embodiments. In other words, an amplified current flows through the motor coils 53, 56 and 57 at angular positions of the rotor spaced 120 degrees apart from each other. It will be appreciated that the rotation of the rotor 15 in the embodiment of Figure 5 is naturally smoother and faster than that of a rotor having two motor field coils illustrated in Figure 4. Component forms of the current wave obtained with the embodiment shown in Figure 5 are illustrated in Figure 6 by the lines III. These current wave forms are each quite similar to the wave form of a three-phase half-wave rectifier and the resulting combined current shows no substantial undulation.

As described hereinbefore, the gyroscope according to the present invention includes a rotor in the form of a cylindrical member made of permanent magnet material and a cooperating stator having one or more pairs of coils disposed therein. Since the rotor is polarized or magnetized radially, a voltage is induced in the generating field coils when the magnetic pole or poles of either polarity of the rotor move past said generating field coils and is then imposed on the motor coils after having been amplified by transistor means while causing those magnetic pole or poles to coact with the remaining magnetic poles so as to attract or repel the latter, such operation being successively repeated thereby to cause the rotor to continue its rotation.

In all of the above described embodiments of the present invention, the rotor has been illustrated as a cylindrical or barrel-shaped member, but it may of course be formed to have radially projecting pole portions as with the case of a rotor of ordinary motors or generators. With such arrangement, the number of times when a voltage is induced during each complete revolution of the rotor may be increased without adding to the number of coils and thus the rotation of the rotor may be made smoother and faster than when the rotor takes the form of a cylindrical member. Thus, according to the present invention, an electrically operated gyroscope is provided which is compact in size and simple in construction. Moreover, once the rotor of the gyroscope is started to rotate from the exterior, it continues to rotate without interruption during the whole service life of the battery and thus may easily attain very high speeds say up to 30,000 r.p.m. or more. Therefore, the gyroscope of the invention is also suitable for use in a limited space. It should be noted that the gyroscope of the invention may be made in sizes especially small and compact, where rotation of a short duration for example of one minute or a fraction thereof is only required to serve the purpose, and that the gyroscope is therefore especially suited to such uses.

What is claimed is:

1. A gyroscope comprising an inner gimbal ring, a stator fixed in said inner gimbal ring, a permanently magnetized rotor journaled in said stator for rotation about an axis normal to the axis of rotation of said inner gimbal, said stator having at least one pair of coils and at least one transistorized power supply circuit having transistor means as a part thereof, said pair of coils and said power supply circuit being mounted on said stator exteriorly of said rotor, one coil of said pair of coils being connected between one electrode and the base of said transistor means and the other coil being connected between the other electrode and the base of said transistor means.

2. A gyroscope comprising an outer gimbal ring, an inner gimbal ring rotatably mounted within said outer gimbal ring, and a permanently magnetized rotor mounted within said inner gimbal ring for rotation about a longitudinal axis coincident with a diameter of said inner gimbal ring extending at right angles to the axis of rotation thereof, said rotor being polarized in the direction of a diameter of said rotor, and said stator having two voltage generating coils and two armature coils disposed alternately around said rotor, two transistor means mounted on said stator each having a base, an emitter and a collector, and two sources of electric power supply mounted on said stator, said current generating coils each being connected between the emitter and the base of one of said transistor means and said magnetic flux generating coils each being connected in series with at least one source of power and the collector and the base of the associated transistor means.

3. A gyroscope comprising an outer gimbal ring, an inner gimbal ring rotatably mounted within said outer gimbal ring, and a permanently magnetized rotor mounted within said inner gimbal ring for rotation about a longitudinal axis coincident with a diameter of said inner gimbal ring extending at right angles to the axis of rotation thereof, said rotor being polarized in the direction of a diameter of said rotor, and said stator having three voltage generating coils and three motor coils disposed alternately around said rotor, three transistor means and sources of electric power supply mounted on said stator, each current generating coils being connected between the emitter electrode and base of one of said transistor means, and each motor coils being connected in series with at least one source of power and the collector electrode and the base of one of the transistor means.

References Cited in the file of this patent

UNITED STATES PATENTS

| | | |
|---|---|---|
| 1,075,770 | Darrow | Oct. 14, 1913 |
| 1,924,816 | Sperry | Aug. 29, 1933 |
| 2,176,804 | Roth et al. | Oct. 17, 1939 |
| 2,810,843 | Granqvist | Oct. 22, 1957 |

FOREIGN PATENTS

| | | |
|---|---|---|
| 971,418 | France | July 19, 1950 |